Nov. 15, 1955 R. E. REASON ET AL 2,723,461

ROUNDNESS MEASURING AND/OR RECORDING APPARATUS

Filed May 16, 1950 6 Sheets-Sheet 1

Inventors:-
Richard Edmund Reason,
George Ormerod Rawstron,
by Pierce, Scheffler & Parker,
Attorneys.

ROUNDNESS MEASURING AND/OR RECORDING APPARATUS

Filed May 16, 1950 6 Sheets-Sheet 2

Inventors:-
Richard Edmund Reason,
George Ormerod Rawstron,
by
Pierce, Scheffler & Parker,
Attorneys.

ROUNDNESS MEASURING AND/OR RECORDING APPARATUS

Filed May 16, 1950 6 Sheets-Sheet 3

Inventors:-
Richard Edmund Reason,
George Ormerod Rawstron,
by Pierce, Scheffler + Parker,
Attorneys.

ROUNDNESS MEASURING AND/OR RECORDING APPARATUS

Filed May 16, 1950 6 Sheets-Sheet 4

Inventors:-
Richard Edmund Reason,
George Ormerod Rawstron,
by Pierce, Scheffler & Parker,
Attorneys.

ROUNDNESS MEASURING AND/OR RECORDING APPARATUS

Filed May 16, 1950 6 Sheets-Sheet 5

Inventors:-
Richard Edmund Reason,
George Ormerod Rawstron,
by
Pierce, Scheffler & Parker,
Attorneys.

Nov. 15, 1955 R. E. REASON ET AL 2,723,461

ROUNDNESS MEASURING AND/OR RECORDING APPARATUS

Filed May 16, 1950 6 Sheets-Sheet 6

Inventors:-
Richard Edmund Reason,
George Ormerod Rawstron,
by Pierce, Scheffler & Parker
Attorneys.

United States Patent Office 2,723,461

Patented Nov. 15, 1955

2,723,461

ROUNDNESS MEASURING AND/OR RECORDING APPARATUS

Richard Edmund Reason, Leicester, and George Ormerod Rawstron, Bitteswell, England, assignors to Taylor, Taylor & Hobson Limited, Leicester, England, a British company Application May 16, 1950, Serial No. 162,164

Claims priority, application Great Britain May 20, 1949

28 Claims. (Cl. 33—174)

This invention relates to apparatus for measuring and recording the roundness and truth of parts and is especially concerned with the measurement of very small errors.

One object of the invention is to provide such apparatus having detecting means which are rotated around the part whilst said part is held stationary.

Another object of the invention is to provide such apparatus in which said detecting means feed recording means adapted to give an indication record in polar coordinate form.

A further object of the invention is to provide such apparatus in which said recording means are adapted to provide an indication record having radial ordinates which are straight and linear.

Figure 1:
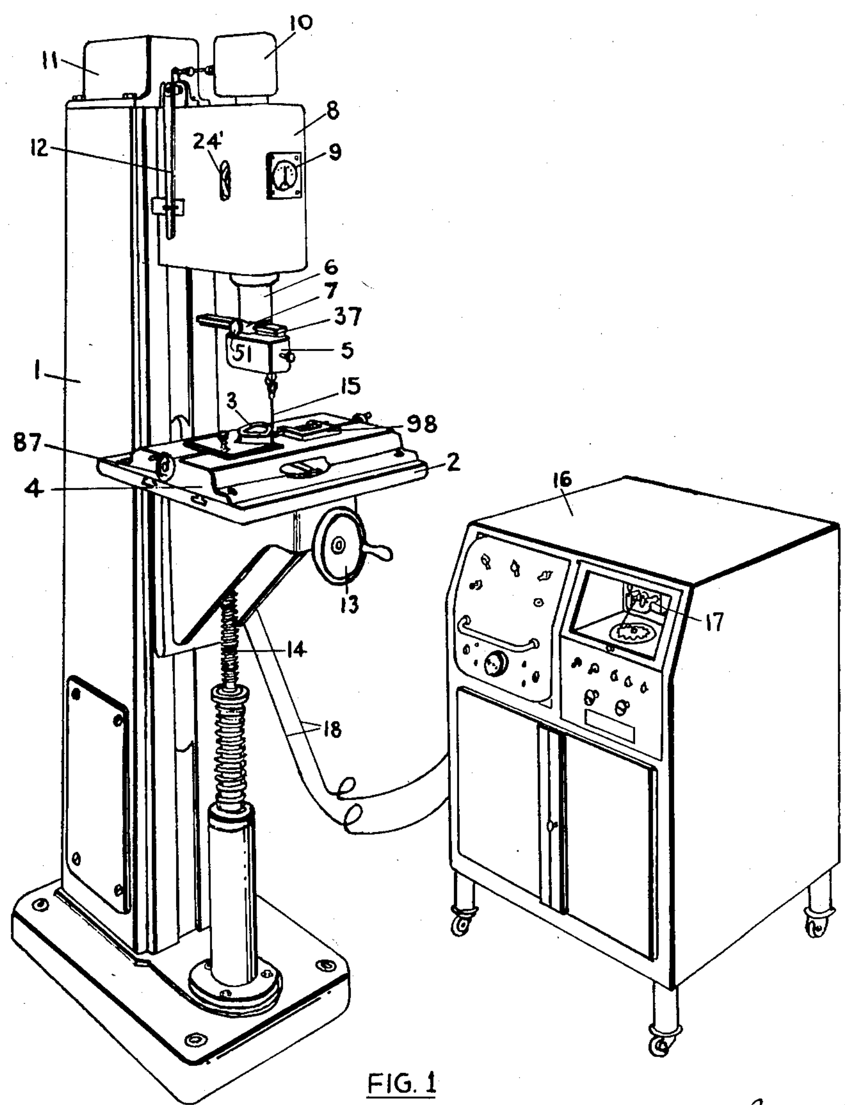
Figure 2:
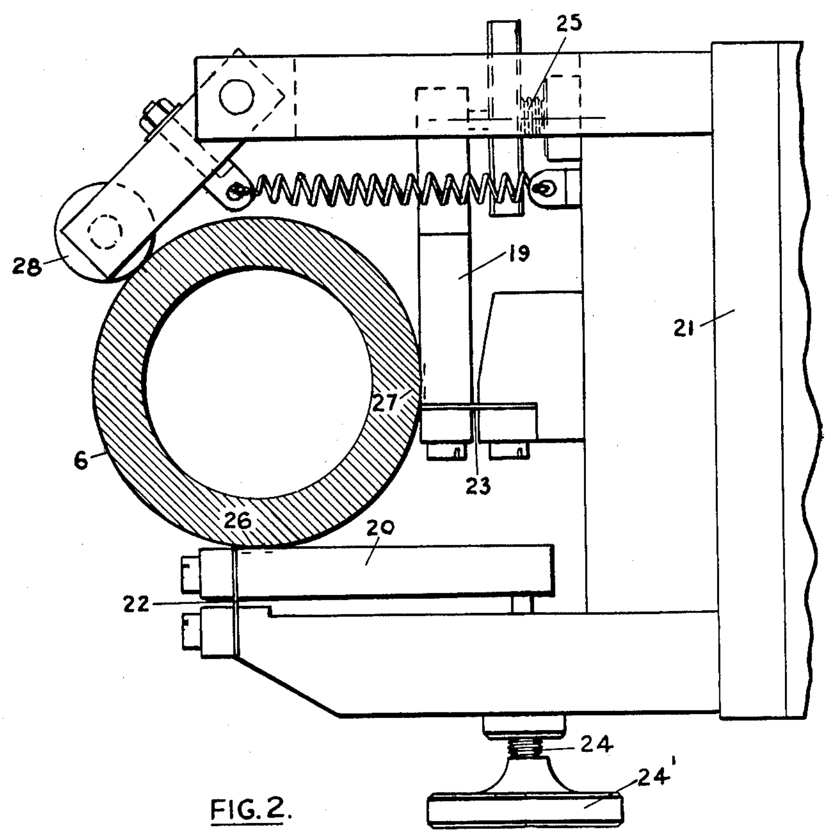
Figure 3:
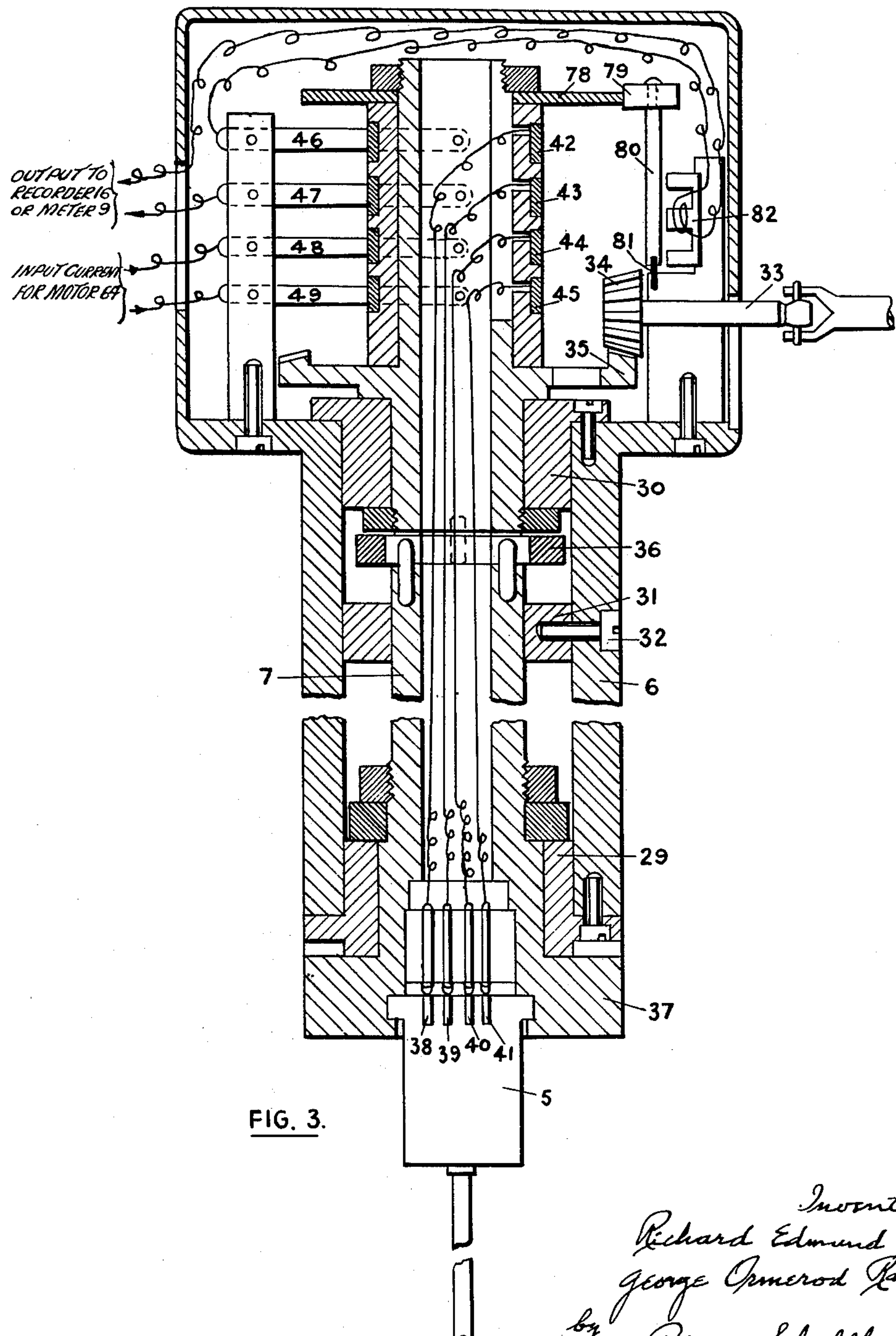
Figure 4:
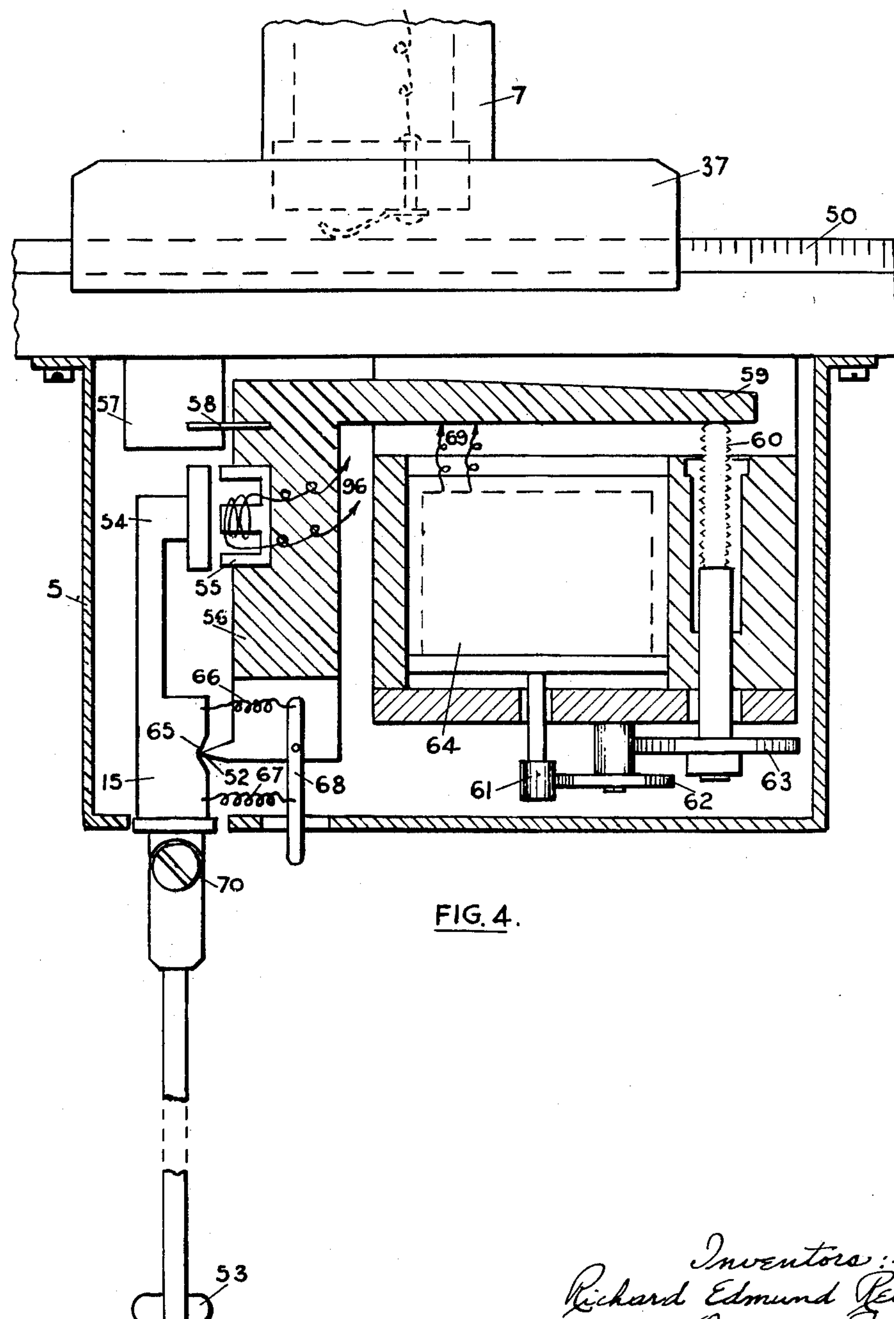
Figure 5A:
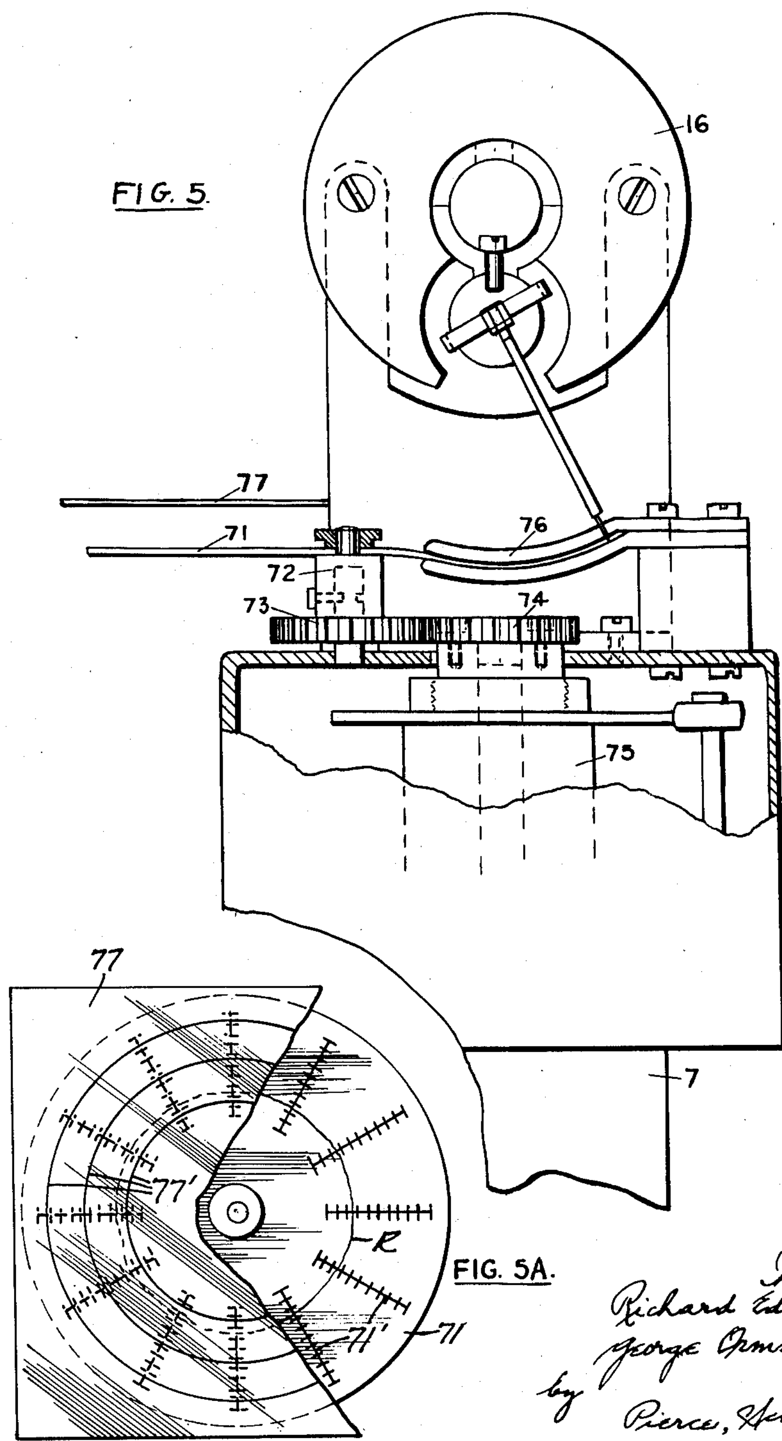
Figure 6:
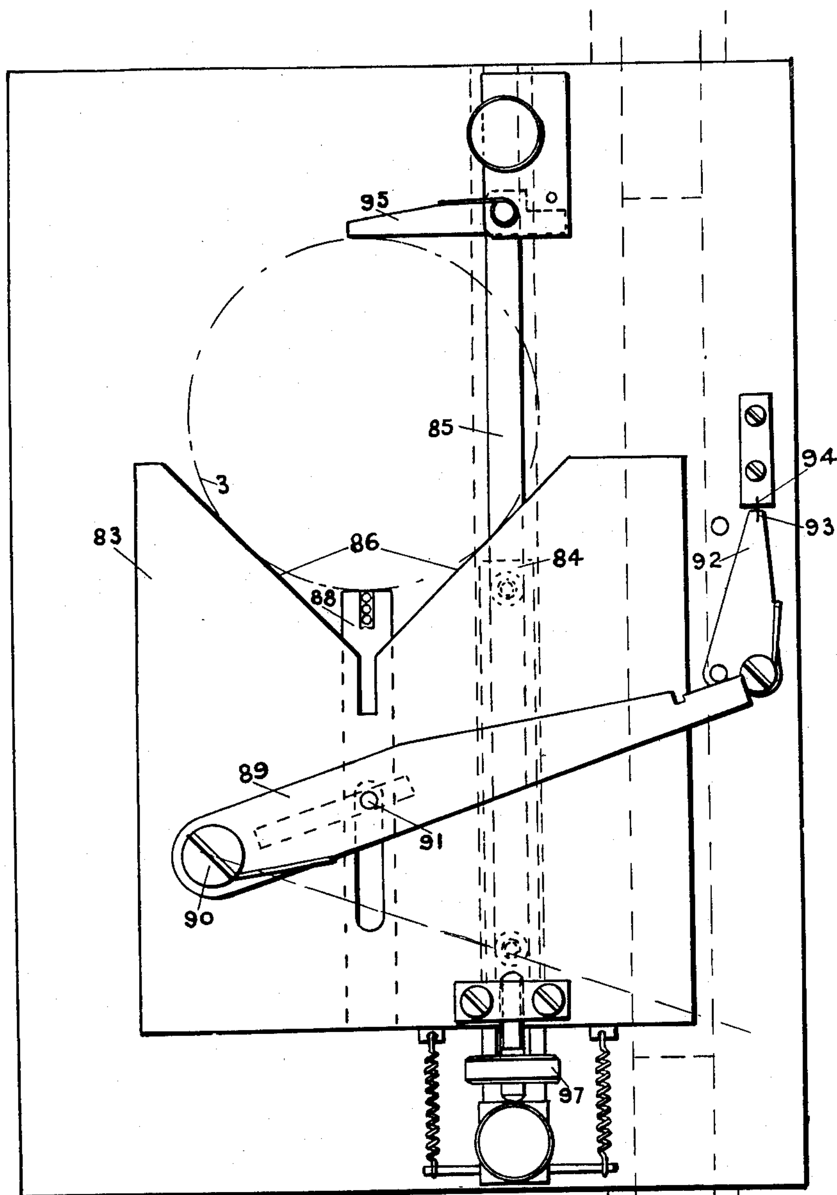

These and other objects and advantages of the invention will be apparent from the following specification when taken with the accompanying drawings, in which:

Fig. 1 illustrates a general perspective view of the roundness testing apparatus, Fig. 2 illustrates details of the mechanism constituting a fine centering arrangement by means of which the axis of a spindle carrying the detecting means can be adjusted relatively to a specimen or part under test, Fig. 3 illustrates the manner in which the spindle is mounted in a quill by means of bushes, Fig. 4 illustrates details of the detecting means, Fig. 5 illustrates details of a modified constructional form of the spindle and a polar recorder device coupled mechanically to the apparatus, Fig. 5A illustrates pertinent details of the polar recorder device of Fig. 5, and Fig. 6 illustrates details of a self-centering device which can be mounted on the apparatus to provide quick initial centering of simple cylindrical specimens.

Referring now to Fig. 1 of the accompanying drawings, this illustrates a general view of the roundness testing apparatus which comprises a pedestal 1 standing on the floor or work bench, a work table 2, carrying a part or specimen 3 under test which is held in a self-centering arrangement 4—described in greater detail hereinafter—a displacement detector device shown generally at 5, a quill 6 carrying a bearing for a spindle 7—the rotating end of which carries the device 5—a housing 8 containing adjustment mechanism, and an auxiliary meter 9 constituting means for giving a preliminary adjustment indication, a housing 10 on the quill 6 containing the drive, slip ring contacts and a correction cam, and a gear box 11 housing a synchronous driving motor and, if desired, a speed changing gear of which the gear change lever is shown at 12.

The work table 2 is provided with means for raising and lowering it on the pedestal according to the height of the specimen 3 and these means conveniently consist of a manually operable handle 13 and screw-threaded member shown at 14.

The output from the detector device 5, which incorporates a displacement sensitive device such as an air-gapped inductance or reactors the gap in which is varied by the movement of a hinged lever 15 carrying a feeler in contact with the specimen 3, is fed to a polar recorder device shown generally at 16.

The detecting means are preferably of the kind shown in which the indicating portion 16 is separate from the portion 5 detecting the displacement to be measured but these parts may be mechanically coupled as illustrated and described hereinafter with reference to Fig. 5.

In Fig. 1, the polar recorder device 16 is synchronised with the spindle 7 by means of synchronous motors or a servo-drive system and an indicator 17 records the movements of the feeler on the lever 15 in contact with the specimen under measurement and test, flexible electrical connections 18 being made between the two units for this purpose.

Fig. 2 illustrates details of the mechanism for adjusting the quill 6 containing the spindle and constitutes a fine centering arrangement by means of which the axis of the spindle can be adjusted relatively to the work, i. e. the specimen under test. This adjustment mechanism is enclosed in the housing 8 (Fig. 1) and is formed of two plates 19 and 20 (Fig. 2) hinged to an arm 21.

The front part of the arm 21 has, in plan, an approximately L-shaped form and the two plates 19 and 20 are hinged to it by means of ligament hinges 22, 23 and are tilted by means of manually operable screws 24 and 25, of which the handle 24' operating the screw 24 can be seen protruding from the housing in Fig. 1.

The quill 6 containing the spindle 7 bears against the plates 19 and 20 at 26 and 27 and is urged into contact with them by spring loaded roller means 28.

Operation of the screws 24 and 25 permits fine adjustment of the position of the quill and, therefore, spindle with a motion parallel to the axis of the spindle and in two directions substantially at right angles.

Fig. 3 illustrates the manner in which the spindle 7 is mounted in the quill 6 by means of bushes 29 and 30. A further bush 31 having a clamping screw 32 is provided to ensure that the spindle 7 is free from radial shake within the quill. The spindle 7 is driven from the motor in the housing 11 (Fig. 1) which is coupled to and drives a shaft 33 and gearing 34, 35 connected to a flexible coupling 36.

The lower part of the spindle 7 is provided with a fitting 37 to receive the detector device 5. Contact members 38, 39 and 40, 41 are incorporated in the device 5 and current is fed through these contact members to complementary slip rings 42, 43 and 44, 45 which are engaged by brushes 46, 47 and 48, 49 in a manner described hereinafter.

The upper part of the spindle 7 carries a correction cam 78 which operates the armature of a second variable air gap inductance for compensating very small residual errors in the spindle; for this purpose the correction cam 78 engages a roller 79 mounted on the end of an armature lever 80 pivoted to the quill housing at 81 and operating this second variable air gap inductance which is shown at 82. The corrective inductance 82 is connected in series with the measuring inductance in the detector device 5 through the brushes 46, 47 slip rings 42, 43 and contact members 38, 39 in whatever circuit is used, for example, a bridge circuit of which the unbalance is used to provide a record of the displacements of the feeler.

The inductance 82 will generally have a much lower value than the inductance in the device 5 in order to make it relatively insensitive as its whole range of operation has generally to correspond only to the extremely small residual displacement errors of the detector device 5 which are of the order of only a few millionths of an inch.

Fig. 4 illustrates details of the detector device 5 which is so arranged that it can be slid along the fitting 37 for which purpose it is provided with a T-section bar 50 and a clamping screw 51 (Fig. 1) by means of which it can be clamped in position. These means constitute a coarse adjustment for nominally adjusting the detector relatively to the specimen under test and this initial coarse radial adjustment of the detector device is facilitated by means of a scale on the bar 50 by means of which the device can be set to the nominal radius of a specimen.

The mechanism of the device 5 is built on to the underside of the bar 50 and comprises a light, generally vertical, lever 15 bearing against a knife edge 52 and carrying a feeler 53 (which contacts the specimen under examination) at its lower end and an armature 54 at its upper end. The armature 54 co-operates with the remaining elements of a variable air-gapped iron cored inductance shown generally at 55 and mounted on a bracket 56 incorporated in the device 5.

The bracket 56 is hinged at 58 to a member 57 on the bar 50 and has a horizontal arm 59 bearing against a fine adjustment screw 60 driven through gearing 61, 62, 63 from a small reversible electric motor 64, so that when the screw 60 is operated the knife edge 52 is displaced in a horizontal plane whereby the separation of the armature and stator of the inductance 55 can be adjusted and brought within the operative range. These means constitute a fine radial adjustment for adjusting the detector relatively to the specimen under test and can be operated, whilst the detector device 5 is rotating, by actuation of the reversible motor 64.

The knife edge 52 engages a V-groove 65 in the lever 15 and is held in contact therewith by means of springs 66, 67 fitted between the lever 15 and a pivoted lever 68, which can be moved at will to either of two end positions in which it is held frictionally so that the feeler 53 can be caused to bear either inwardly, for example against a shaft, or outwardly, for example against the walls of a hole. Furthermore, by mounting the stator of the inductance 55 and the hinged member 68 on the same leg of the bracket 56 they are fixed relatively to each other so that fine adjustment moves the whole detector unit.

Other forms of displacement sensitive devices, either electrical or pneumatic, may be employed either as single units or in differential form and may incorporate, for example, capacitances instead of inductances.

The ends 96 of the coil in the inductance 55 are connected to the contact members 38, 39 (Fig. 3) whereby the current in the inductance 55 and varied by movements of the armature 54 on the lever 15 following movements of the feeler 53 travelling over variations in the specimen under test is ultimately fed, via the slip rings 42, 43 and brushes 46, 47 to the polar recorder device 16, whilst an operating current supply is fed to the motor 64 via brushes 48, 49, slip rings 44, 45 and contacts 40, 41 which are connected to the ends 69 of the winding in the motor 64.

As shown in Fig. 4, the lower part of the lever 15, that is, the part carrying the feeler 53 is provided with a hinge 70, for example, a ball-joint hinge, so that the lever may be inclined at any angle to the axis of the spindle 7 whereby cylinders, cones and shoulders can all be measured.

In a modification, mechanical means constituting a fine radial adjustment for adjusting the detector relatively to the specimen under test can be employed and can comprise, for example, a lever system adapted to be actuated by axial displacement of a thrust rod engaging said mechanical means at one end and a manual control member at the other end, said mechanical means adjusting the displacement sensitive device incorporated in the detecting device.

Fig. 5 illustrates details of a modified constructional form of the spindle 7 and the polar recorder device 16 in which the recorder and a graph chart 71 on which the indication record is made are coupled mechanically to the apparatus.

As shown in this figure, the chart 71—which can be made conveniently of paper—is mounted on a shaft 72 driven through 1:1 gearing 73, 74 of which the gear 74 is mounted on an auxiliary shaft 75 mechanically coupled with the spindle 7 so as to eliminate rotational discrepancies between the detector device 5 and the chart 71.

One side of the chart 71 is caused to travel through a curved gate 76 and straight radial ordinates which are linear are plotted by the recorder 16. The recorder is illustrated in Fig. 5 as incorporating a moving coil unit, this unit being fed with currents produced by the detector device 5.

The advantage of driving the chart through a 1:1 gear is that points taken clockwise round the graph correspond with points taken clockwise round the part under measurement when the part is lying on the work table and is viewed from above. A scaled transparent template 77 may be disposed above the chart 71 to facilitate the interpretation of the graph drawn by the recorder, or a template of this kind can be placed over the chart when the latter has been removed from the apparatus.

For example, as shown in a reduced-scale plan view of Fig. 5A radial graph lines 71[1] may be printed on the graph paper 71 and circular graph lines 77[1] on the auxiliary transparent template 77 which, as just mentioned, can be laid over the paper after the graph or indication record R has been plotted and floated until the circles on it have a best fit to the graph.

This facilitates the interpretation of graphs plotted with some residual degree of eccentricity because when the eccentricity is very small compared with the radius of the specimen and the graph is plotted, as is usual, with a suppressed zero in the radial direction, it is correct to read the angular dispositions of the irregularities from the original axis of rotation and their radial dispositions from the center of the best fitting circle.

Fig. 6 illustrates details of the self-centering fixture 4 mounted on the work table 2 (Fig. 1). This fixture 4 provides quick initial centering of simple cylindrical specimens such as ball races which must not be strained by the application of appreciable radial forces. It is mounted on the work table 2 with its axis in line with the mean position of the spindle 7, the position of the spindle being finally adjusted by the fine centering adjustment described with reference to Fig. 2.

The arrangement shown in Fig. 6 does not impose any excessive distorting force on the circumference of the specimen being measured and comprises a sliding plate 83 guided for motion across the work table 2 (Fig. 1) by means of a tongue 84 and groove 85 (Fig. 6). On one side of the plate 83 there is formed a 90° V shown at 86 which engages a specimen 3, the direction of motion of the plate 83 being along the bisector of the V which bisector also intercepts the axis of rotation of the spindle 7 when in its mean position, the plate 83 being moved to its nominal desired position by rotation of handle 87 shown in Fig. 1, further, finer, adjustment being effected by the spring loaded knob device 97.

There is also mounted for sliding motion along the bisector of the V a depth indicating bar 88 whose tip abuts against the specimen when the specimen is in contact with the V.

It will be appreciated that as the diameter of centered specimens increases the necessary displacement of the plate 83 will be greater than that of the bar 88 by an amount which will bear a constant proportion to the radius of the specimen. Three points, one on the work table 2, one on the plate 83 and one on the bar 88 can therefore be chosen such that the three points always lie along a straight line. In this way abutments can be provided to mark two of the three points and a straight edge or equivalent to represent the line and an index mark to represent the third point.

As illustrated in Fig. 6 the depth bar 88 is coupled to the plate 83 through a lever 89 pivoted to the plate 83 at 90 and bearing against a pin 91 on the depth bar 88 such that the lever 89 lies substantially at right angles to the axis of the V 86 when the plate 83 and depth bar 88 simultaneously engage a centered cylindrical specimen of average diameter. Fig. 6 also shows a magnifying lever 92 carrying an index mark 93, the coincidence of which with a fixed mark 94 on the work table 2 serves to determine the correct relative position of the plate and depth bar for centering any size of specimen.

In practice the specimen is held against the V 86 manually or by a light spring lever 95 or, alternatively, by a clamp of the kind shown at 98 in Fig. 1.

To operate the apparatus a specimen 3 is placed on the work table 2 and held in the self-centering fixture 4 which is positioned under the axis of the spindle 7, fine adjustment of the spindle being effected by the screws 24 and 25 (Fig. 2).

The detector device 5 is then positioned by adjustment of the bar 37 until the feeler 53 on the end of the lever 15 engages the specimen. The motor mounted in the housing 11 is then set in operation so that the spindle 7 and, therefore, the detector device 5, lever 15 and feeler 53 rotate round the stationary specimen 3 and fine adjustment of the detector device is then made by operation of the motor 64 (Fig. 4). The fine adjustment motor 64 can be conveniently controlled for this purpose through a bridge connected potentiometer at the mid-point of which the current falls to zero and reverses in direction.

During the preliminary adjustment operations it is more convenient to switch the auxiliary indicating meter 9 into circuit than the recorder 16 so that current need flow through the recorder only for a single operative rotation of the spindle.

It is useful, but not essential, to provide change speed gearing in the housing 11 in order to vary the speed of rotation of the spindle 7, a lower speed being preferred at first when the initial errors of centering are large, and a greater speed being preferable as perfection is approached.

We claim:

1. Apparatus for measuring and recording the roundness of surfaces of nominally circular section, comprising a supporting structure, a spindle, driving means for continuously rotating said spindle, bearing means on the supporting structure for accurately defining the axis of rotation of the spindle, precision means for holding the surface under test stationary on the supporting structure in a position accurately coaxial with such axis of rotation during rotation of said spindle, a recording device having a recording member and a chart for giving an indication record in polar coordinates, means incorporated in such recording device whereby the recording member is caused to cooperate with the chart along radial ordinates which are straight and linear, means for rotating the chart of the recording device about its axis in synchronism with the rotation of the spindle, a detecting device carried by the spindle, means for adjusting the radial position of at least part of the detecting device with respect to the axis of rotation of the spindle, whereby a datum in such device can be located at a chosen radial distance from such axis, means incorporated in the detecting device responsive to the radial distance of the test surface from such datum for producing an output dependent on any errors in roundness of the test surface, and means including an amplifier for transmitting said detecting device output to said recording device to develop an amplified indication of such errors.

2. Apparatus as claimed in claim 1, wherein said driving means for said spindle includes a driving member and a flexible coupling between the same and said spindle, and said means for rotating said chart is driven from said driving member.

3. Apparatus as claimed in claim 1, wherein said precision holding means includes a centering device for readily locating a cylindrical workpiece bearing the test surface; said centering device comprising a frame carried by the supporting structure, a block having a V-shaped recess and mounted to slide on the frame in the direction of the bisector of the V of the recess, means for urging the workpiece into engagement with the recess, a depth bar which is mounted to slide along the said bisector and whose end engages with the workpiece, and an indicating lever coupled to the block and the depth bar, and cooperating with an indication position on the frame; the centering coaxial with the axis of rotation of the spindle being effected by sliding the block and the depth bar until the indicating lever reaches the indicating position.

4. Apparatus as claimed in claim 1, in which the means for adjusting the radial position of the detecting device includes coarse adjustment means comprising a fitting on the spindle and a bar carrying the detecting device and slidably mounted in such fitting, and fine adjustment means operative during rotation of the spindle for effecting fine adjustment of the radial position of at least part of the detecting device.

5. Apparatus as claimed in claim 1, in combination with means for effecting a fine adjustment of the spindle and its bearing means transversely on the supporting structure to bring the axis of rotation into a position in which it is accurately coaxial with the axis of the test surface.

6. Apparatus as claimed in claim 5, wherein the fine adjustment device comprises two abutment members, resilient means urging the spindle bearing means into engagement with such abutment members, and means for adjusting the two abutment members respectively in two mutually inclined directions at right angles to the spindle axis.

7. Apparatus for measuring the roundness of surfaces of nominally circular section, said apparatus comprising a supporting structure, a continuously rotating spindle, bearing means on the supporting structure for accurately defining the axis of rotation of the spindle, means for holding the surface under test stationary during the spindle rotation and in a position on the supporting structure coaxial with such axis of rotation, a detecting device carried by the spindle and cooperating with the test surface for producing an output dependent on any errors in roundness of the test surface, and means actuated by such output for giving an amplified indication of such errors; such detecting device including a knife edge, a lever fulcrumed on the knife edge, a detecting element carried by the lever for engagement with the test surface and whose working movements in accordance with errors in roundness of the test surface act through the lever to control the output of the detecting device, a spring device for holding the lever in engagement with the knife edge, and means operable at will for controlling the spring device to bias the detecting element to bear inwardly against a convex test surface or alternatively to bear outwardly against a concave test surface.

8. Apparatus as claimed in claim 7, wherein the arm of the lever carrying the detecting element includes a hinge, whereby such element may be adjusted to and clamped in any desired angular position in a plane containing the axis of rotation.

9. Apparatus for measuring and recording the roundness of surfaces of nominally circular section, said apparatus comprising a supporting structure, a continuously rotating spindle, bearing means on the supporting structure for accurately defining the axis of rotation of the spindle, means for holding the surface under test stationary during the spindle rotation and in a position on the supporting structure coaxial with such axis of rotation, a recording device including a rotatable support for a polar coordinate chart and a stylus movable in a radial plane through the axis of rotation of the chart support, thereby to develop an indication record in polar coordinates of which the radial ordinates are straight and linear, means for rotating the chart support of the recording device about its axis in synchronism with the rotation of the spindle, a detecting device carried by the spindle and incorporating a detecting element which engages with the test surface during the spindle rotation and whose working movements relatively to a datum position in accordance with any errors in roundness of the test surface take place in a plane containing the axis of spindle rotation, said detecting device including means for adjusting the datum position of the detecting element radially with respect to the axis of rotation of the spindle and means for developing an electrical output varying with radial movement of said detecting element as it moves around the surface under test, but independent of the radial distance of the datum position from the axis of rotation and means including an amplifier for imposing said electrical output upon the recording device.

10. Apparatus as claimed in claim 9, wherein said detecting device includes means operable at will to bias said detecting element to bear either inwardly against a convex test surface or outwardly against a concave test surface, and means whereby in either case an outward working movement will always appear as an increase in the radial ordinate of the indication record and an inward working movement as a decrease therein.

11. Apparatus as claimed in claim 9, wherein the detecting device includes a knife edge, a lever pivoted about the knife edge and carrying the detecting element, a spring device for holding the lever in engagement with the knife edge, and means operable at will for adjusting the spring device to bias the detecting element to bear inwardly or outwardly as may be required.

12. Apparatus as claimed in claim 9, wherein the detecting device includes at least one reactor having a variable airgap controlled by the working movements of the detecting element.

13. Apparatus as claimed in claim 12, in combination with an additional variable airgap reactor, and a cam driven in synchronism with the spindle for actuating such additional reactor to compensate for small residual errors in the spindle.

14. Apparatus for measuring the roundness of surfaces of nominally circular section, comprising a supporting structure, a continuously rotating spindle, bearing means on the supporting structure for accurately defining the axis of rotation of the spindle, precision means for relatively adjusting the spindle and the surface under test to ensure that they are accurately coaxial with one another, means for holding the surface under test stationary during the spindle rotation, a detecting device carried by the spindle and having a detecting element cooperating with the test surface for producing an output dependent on any errors in roundness of the test surface, means actuated by such output for developing an amplified indication of such errors, means for effecting coarse adjustment of the radial position of the detecting device with respect to the axis of rotation of the spindle and means operable during rotation of said spindle for effecting a fine adjustment of the radial position of at least part of the detecting device relatively to the axis of rotation.

15. Apparatus as claimed in claim 14, wherein said fine adjustment means comprises a reversible motor, gearing driven by such motor, and an adjusting member actuated by the gearing and acting on a part of the detecting device whereby the detecting element is displaced radially with respect to the axis of rotation.

16. Apparatus as claimed in claim 14 wherein said fine adjustment means comprise a thrust rod disposed substantially centrally relatively to the axis of rotation, and a mechanical transmission system actuated by axial movement of the thrust rod for radially displacing a part of the detecting device.

17. Apparatus as claimed in claim 14, wherein the detecting element engages with the test surface during the spindle rotation and the working movements thereof in accordance with errors in roundness of the test surface control the output of the detecting device.

18. Apparatus as claimed in claim 17, wherein the detecting device includes a knife edge, a lever fulcrumed about the knife edge and carrying the detecting element, a spring device for holding the lever in engagement with the knife edge, and means operable at will for adjusting the spring device to bias the detecting element to bear either inwardly against a convex test surface or outwardly against a concave test surface.

19. Apparatus as claimed in claim 14, wherein the detecting device includes at least one reactor having a variable airgap, and a detecting element which engages with the test surface and whose working movements in accordance with errors in roundness of the test surface act to vary such airgap, thereby to control the output of the detector device in the form of electrical energy.

20. Apparatus as claimed in claim 14, wherein the precision adjustment means comprises two abutment members, resilient means urging the spindle bearing means into engagement with such abutment members, and means for adjusting the two abutment members respectively in two mutually inclined directions at right angles to the spindle axis.

21. Apparatus as claimed in claim 14, in combination with a centering device for readily locating a cylindrical workpiece bearing the test surface, said centering device comprising a frame carried by the supporting structure, a block having a V-shaped recess and mounted to slide on the frame in the direction of the bisector of the V of the recess, means for urging the workpiece into engagement with the recess, a depth bar which is mounted to slide along the said bisector and whose end engages with the workpiece, and an indicating lever coupled to the block and the depth bar, said indicating lever cooperating with an indication position on the frame, the centering of the test surface coaxial with the axis of spindle rotation being effected by sliding the block and the depth bar until the indicating lever reaches the indicating position.

22. Apparatus for measuring the roundness of surfaces of nominally circular section, said apparatus comprising a supporting structure, a continuously rotating spindle, bearing means on the supporting structure for accurately defining the axis of rotation of the spindle, means for holding the surface under test stationary during the spindle rotation and in a position on the supporting structure coaxial with such axis of rotation, a fine adjustment device for displacing the spindle and its bearing means transversely on the supporting structure while maintaining the spindle axis parallel to its original direction during the adjustment to enable such axis to be aligned with a high degree of accuracy on the axis of the test surface, a detecting device carried by the spindle and cooperating with the test surface for producing an output dependent on any errors in roundness of the test surface, and means actuated by such output for giving an amplified indication of such errors; the fine adjustment device comprising two abutment members, resilient means urging the spindle bearing means into engagement with the abutment members, and means for adjusting the two abutment members respectively in two mutually inclined directions at right angles to the spindle axis.

23. Apparatus as claimed in claim 22, wherein the bearing means for the spindle are constituted by a quill housing the spindle, in combination with hinge means for the two abutment members, whereby such members are respectively adjustable about axes parallel to the spindle axis.

24. Apparatus as claimed in claim 22, in combination with a driving member for driving the spindle, and a flexible coupling through which the spindle is driven by the driving member.

25. Apparatus as claimed in claim 22, in combination with means for adjusting at least part of the detecting device radially relatively to the spindle axis to accommodate different test surface radii.

26. Apparatus comprising in combination, a supporting frame, a centering device for quickly centering a cylindrical workpiece, a rotatable spindle, a device carried by the spindle for cooperating with the workpiece, and fine adjustment means for adjusting the spindle transversely relatively to the supporting frame, while maintaining the direction of the spindle axis unaltered during the adjustment, to enable the spindle axis to be accurately aligned with the axis of the workpiece when centered, the centering device comprising a block having a V-shaped recess and mounted to slide on the frame in the direction of the bisector of the V of the recess, means for urging the workpiece into engagement with the recess, a depth bar mounted to slide along the said bisector and whose end engages with the workpiece, and an indicating lever coupled to the block and to the depth bar and cooperating with an indication on the frame, the centering being effected by sliding the block and the depth bar until the indicating lever reaches a preselected position associated with the said indication.

27. Apparatus as claimed in claim 26, in combination with a quill housing the spindle, and wherein the fine adjustment means device comprises two abutment members, means for urging the quill into engagement with the abutment members, and means for adjusting the abutment members respectively in two mutually inclined directions at right angles to the spindle axis.

28. Apparatus for measuring the roundness of a surface of a cylindrical workpiece, comprising in combination, a supporting frame, a centering device for quickly centering the workpiece, a rotatable spindle coaxial with the axis of the workpiece when centered by such device, and a detecting device carried by the spindle for cooperation with the workpiece surface and responsive to any errors in roundness of the workpiece surface under test, the centering device comprising a block having a V-shaped recess and mounted to slide on the frame in the direction of the bisector of the V of the recess, means for urging the workpiece into engagement with the recess, a depth bar mounted to slide along the said bisector and whose end engages with the workpiece, and an indicating lever coupled to the block and to the depth bar and cooperating with an indication on the frame, the centering being effected by sliding the block and the depth bar until the indicating lever reaches a preselected position associated with the indication.

References Cited in the file of this patent

UNITED STATES PATENTS

| | | |
|---|---|---|
| 526,198 | Pringle et al. | Sept. 18, 1894 |
| 709,253 | Bausch | Sept. 16, 1902 |
| 826,971 | Stowell | July 24, 1906 |
| 881,865 | Nichols | Mar. 10, 1908 |
| 945,261 | Blum | Jan. 4, 1910 |
| 1,241,469 | Payne | Sept. 25, 1917 |
| 1,339,955 | Hardel | May 11, 1920 |
| 1,403,156 | Gonzalez | Jan. 10, 1922 |
| 1,487,119 | Newitt | Mar. 18, 1924 |
| 1,823,719 | Baker | Sept. 15, 1931 |
| 1,842,502 | Blomquist | Jan. 26, 1932 |
| 1,928,457 | Mershon et al. | Sept. 26, 1933 |
| 1,994,497 | Winters | Mar. 19, 1935 |
| 2,143,233 | Wallace | Jan. 10, 1939 |
| 2,150,070 | Kregecz | Mar. 7, 1939 |
| 2,178,264 | Meyer | Oct. 31, 1939 |
| 2,179,602 | Smith | Nov. 14, 1939 |
| 2,239,811 | Cuppers | Apr. 29, 1941 |
| 2,241,401 | Haskell | May 13, 1941 |
| 2,261,093 | Poupitch | Oct. 28, 1941 |
| 2,380,251 | Ludbrook | July 10, 1945 |
| 2,483,743 | Turrettini | Oct. 4, 1949 |
| 2,524,538 | Pearson | Oct. 3, 1950 |
| 2,550,707 | McKinstry | May 1, 1951 |
| 2,611,969 | Hrcek | Sept. 30, 1952 |

FOREIGN PATENTS

| | | |
|---|---|---|
| 637,464 | Germany | Oct. 29, 1936 |